Dec. 21, 1943. D. D. KNOWLES Re. 22,408

STROBOSCOPIC TESTING APPARATUS

Original Filed Oct. 1, 1930 2 Sheets-Sheet 1

INVENTOR
Dewey D. Knowles
BY F. W. Lyle
ATTORNEY

Dec. 21, 1943. D. D. KNOWLES Re. 22,408

STROBOSCOPIC TESTING APPARATUS

Original Filed Oct. 1, 1930 2 Sheets-Sheet 2

INVENTOR
Dewey D. Knowles
BY F. W. Lyle
ATTORNEY

Reissued Dec. 21, 1943

Re. 22,408

UNITED STATES PATENT OFFICE 22,408

STROBOSCOPIC TESTING APPARATUS

Dewey D. Knowles, Verona, N. J., assignor to Westinghouse Electric & Manufacturing Company, a corporation of Pennsylvania Original No. 1,979,692, dated November 6, 1934, Serial No. 485,809, October 1, 1930. Application for reissue March 24, 1941, Serial No. 385,032

6 Claims. (Cl. 315—238)

My invention relates to apparatus for examining rapidly rotating or vibrating objects and has special relation to stroboscopic apparatus whereby a beam of light is adapted to flash intermittently in accordance with the frequency of the rotating or vibrating object.

The theory of my invention is briefly described as follows:

Supposing that an object has a periodic motion and that, at exactly the same point in the opposite cycle of motion, a light of short duration is flashed upon it, then, to the eye or camera, said object will be visible only when the light is upon it. As this period is of short duration and always occurs when the body is in exactly the same position, the result is that the object appears motionless. If the frequency of the flash of light is made slightly less than the frequency of the periodic motion, the object will be seen at a different point during each successive cycle, and it will appear to be tracing its course at a frequency equal to the difference between its actual frequency and the frequency of the light flashes. Correspondingly, if the frequency of the light flashes is greater than that of the object studied, it will appear as if the object is tracing its course in a reverse direction.

The object is visible during the entire period that the light is upon it, and, in order that the visibility be not blurred, the light must be of very short duration. It is necessary, therefore, that means of obtaining a light of considerable intensity and very short duration be provided.

An object of my invention, therefore, is to provide apparatus of the above-mentioned character, in which the frequency of the light flashes is controlled electrically by means of an oscillatory circuit.

Another object of my invention is to provide apparatus, as described above, in which an electric discharge tube of the grid-glow type is utilized to obtain a light of considerable intensity and very short duration.

A further object of my invention is to provide means, comprising a mechanical contactor, for flashing a light at a frequency of the rotating object.

These and other objects will be more fully explained, and a better understanding may be had of my invention, by referring to the following description, taken in conjunction with the accompanying drawings, in which.

Figure 1:
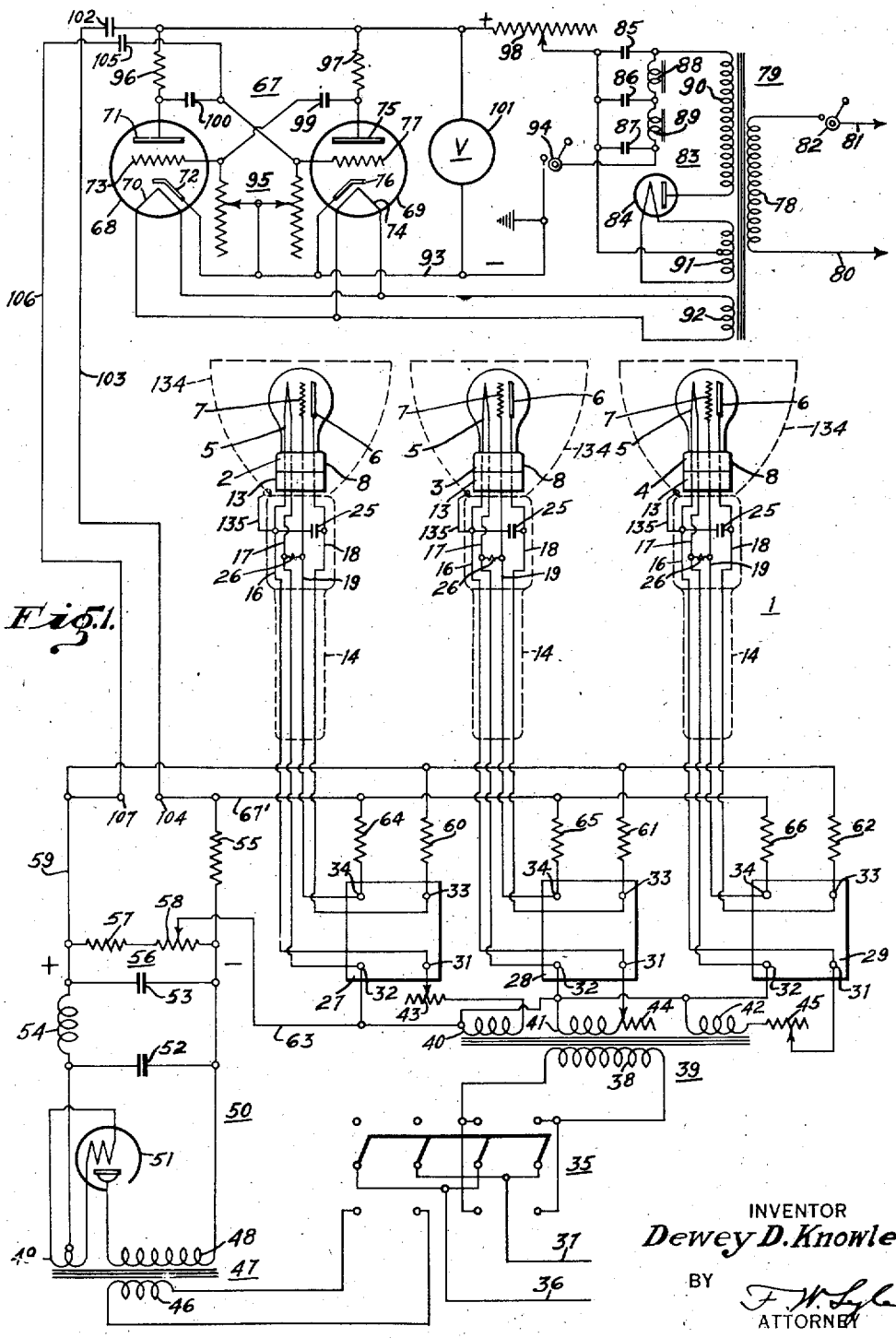
Figure 1 is a diagrammatic view of a testing apparatus and the various circuits therefore constructed in accordance with my invention.
Figure 2:
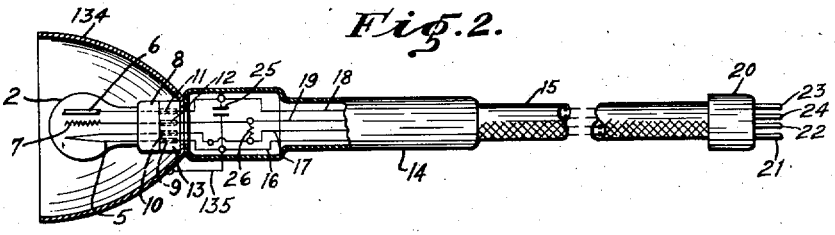
Fig. 2 is a view, in side elevation, partly in section, of one of the grid-glow tubes shown in Fig. 1.

Referring to Figs. 1 and 2, a three-lamp unit 1 comprises three grid-controlled electric-discharge tubes 2, 3 and 4. Since the tubes 2, 3 and 4 are of identical structure and have the same circuit connections, only the tube 2 will be described in detail. The tube 2 comprises a filament 5, an anode 6 and a grid 7. The usual base member 8 is provided, through which the contact members 9 and 10 of the filament 5 and contact members 11 and 12 of the anode 6 and grid 7, respectively, protrude. A receptacle 13, adapted to receive the contact members 9, 10, 11 and 12, is secured at one end of a hollow handle 14 which is constructed of insulating material. A shield or reflector 134 is secured to the handle 14 below the receptacle 13, and the reflector 134 is connected, by means of a conductor 135, to conductor 16 of the filament circuit to shield the tube from the body-capacity of the operator. A flexible cable 15 is secured at the other end of the handle 14 and is adapted to carry conductors 16 and 17, which are connected, through the receptacle 13, to the contact members 9 and 10, and conductors 18 and 19 are connected, respectively, through the receptacle 13, to contact members 11 and 12.

A connecting plug 20 of insulating material is secured to cable 15, at one end thereof, and is provided with male contact members 21, 22, 23 and 24, which are connected, respectively, to conductors 16, 17, 18 and 19.

A condenser 25, in the hollow portion of the handle 14, is connected to conductors 16 and 18, and a resistor 26 is connected to conductors 17 and 19 for a purpose to be hereinafter more fully explained.

The unit 1 is provided with three socket members 27, 28 and 29. Each of the socket members has female contact members 31, 32, 33 and 34, adapted to receive, respectively, the male contact members 21, 22, 23 and 24 of the connecting plug 20.

The hinge members of a four-pole double-throw switch 35, are connected, through conductors 36 and 37, to a source of electric energy (not shown). A primary winding 38 of a transformer 39 is so connected to the jaw members of the switch 35 that current will flow through the primary winding 38 when the switch 35 is in either of its closed positions. The transformer 39 has three secondary windings 40, 41 and 42. Each of the secondary windings 40, 41 and 42 are connected, respectively, through variable resistors 43, 44 and 45, to the contact members 31 and 32 of the respective socket members 27, 28 and 29.

A primary winding 46 of a transformer 47 is so connected to the switch 35 that the winding 46 will become energized when the switch 35 is in its lower closed position. The transformer 47 also comprises a high-voltage secondary winding 48 and a low-voltage secondary winding 49.

A power pack 50, comprising a rectifying tube 51 condensers 52 and 53 and a choke coil 54, is adapted to be energized by the primary winding 46 of the transformer 47.

The voltage divider 56, comprising a fixed resistor 57 and a variable resistor 58, is connected across the output of the power pack.

The plus side of the output of power pack 50 is connected, through conductor 59 and resistors 60, 61 and 62, respectively, to the contact member 33 of the socket members 27, 28 and 29, respectively.

The contact members 32 of the socket members 27, 28 and 29 are connected, through conductor 63, to the variable point of resistor 58.

The minus side of power pack 50 is connected, through resistor 55, and conductor 67', to contact members 34 of the socket members 27, 28 and 29, through resistors 64, 65 and 66, respectively.

A multi-vibrator unit 67 comprises a pair of vacuum tubes 68 and 69. The tube 68 comprises a filament 70, plate 71, cathode 72 and grid 73. The tube 69 comprises a filament 74, a plate 75, a cathode 76 and a grid 77.

A primary winding 78 of a transformer 79 is adapted to be energized through conductors 80 and 81 and a switch 82 by a source of energy (not shown).

A power pack 83. comprising a rectifying tube 84, condensers 85, 86, 87 and choke coils 88 and 89, is energized by a high-voltage secondary-winding 90 and a low-voltage secondary winding 91 of the transformer 79. A third secondary winding 92 of the transformer 79 serves to energize the filaments 70 and 74 of the tubes 68 and 69.

The cathodes 72 and 76 of the respective tubes 68 and 69 are connected, through conductor 93 and a switch 94, to the negative side of the output of power pack 83.

The grids 73 and 77 of the respective tubes 68 and 69 are connected, through a variable resistor 95, to the circuit controlling the cathodes 72 and 76.

The plates 71 and 75 of the tubes 68 and 69, respectively, are connected, through fixed resistors 96 and 97, respectively, and a variable resistor 98, to the positive side of the output of power pack 83.

The grid member 73 of the tube 68 is connected, through a condenser 99, to plate 75 of the tube 69. The grid 77 of the tube 69 is connected, in like manner, through a condenser 100, to the plate 71 of tube 68.

A voltmeter 101 is connected from the plus side of the multivibrator unit to conductor 93 for a purpose to be hereinafter more fully explained.

The positive side of the output of the multivibrator unit 67 is connected, through a condenser 102, conductor 103, female contact member 104 and resistor 55, to the negative side of the output of the power pack 50.

The negative side of the output of the multivibrator unit 67 is connected, through condenser 105, conductor 106 and female contact member 107, to the positive side of the output of the power pack 50.

Figure 3:
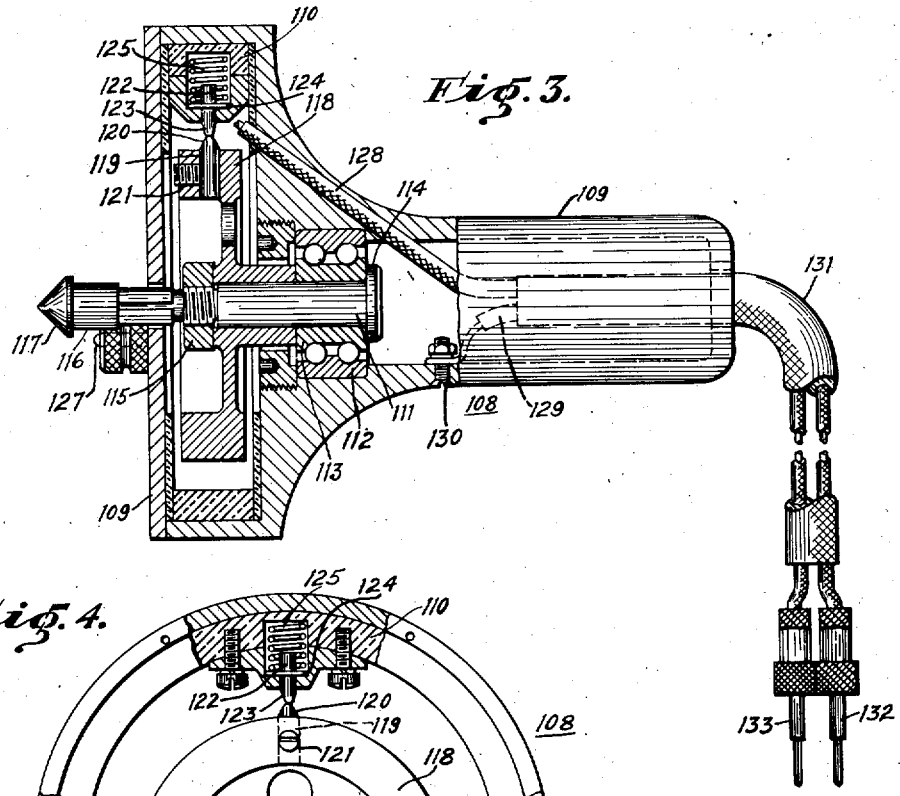
Fig. 3 is a view, in side elevation, partly in section, of a contactor device constructed in accordance with my invention.
Figure 4:
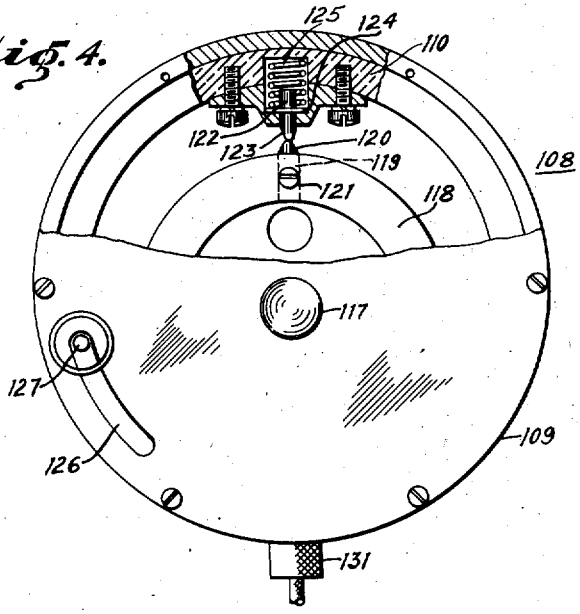
Fig. 4 is a view, in front elevation, of the device shown in Fig. 3, parts being broken away.

The examining rotating objects secured to a shaft having a lathe center, the modification shown in Figs. 3 and 4 may be used. Referring to Fig. 3, a mechanical contactor 108 is illustrated.

A hollow metal casing 109 is provided with a recess near one end in which a ring 110 of insulating material is slidably mounted.

A shaft member 111 is rotatably mounted, by means of bearing members 112 and 113, in the casing 109. The shaft 111 is provided with a collar 114 and an adjustable nut 115 to prevent longitudinal movement of the shaft with respect to the bearing members. One end of the shaft 111 is adapted to protrude through an opening in the casing 108 and is fitted with a tachometer tip 116 having a conical bearing surface 117. A metal spider 118 is fixedly secured to the shaft 111 and is adapted to rotate therewith. A steel contact member 119, having a conical tip 120, is secured, by a set screw 121, to the peripheral edge of the spider 118 in such manner that the tip 120 protrudes therefrom. A contact member 122, having a conical tip 123, is yieldingly mounted, by means of a collar 124 and a spring 125, in a recess provided in the insulated ring 110.

An arcuate slot 126 is provided in the casing 109 through which protrudes a threaded pin 127 which is secured to the slidably mounted ring 110. A knurled nut is adapted to be screwed upon the pin 127 to prevent movement of the pin with respect to the casing. The shaft 111 is mounted eccentrically with respect to the axis of the ring 110. It is apparent, therefore, that adjustment of the contact member 122, with respect to the contact member 119, may be made by shifting the position of the ring 110.

An insulated conductor 128 is connected to the contact member 122, and a conductor 129 is grounded to the casing 109 by means of a terminal member 130. Conductors 128 and 129 are connected, through a flexible cable 131, to male contact members 132 and 133, respectively.

The operation of the device, when using the multivibrator unit, is as follows: The switch 35 is closed in its upper position, and the filaments 5 of the tubes 2, 3 and 4 are energized. When the filaments are sufficiently heated, the switch 35 is actuated to its lower closed position. The filaments 5 will still be energized, and the power pack 50 will be energized through transformer 47. The condensers 25 will then charge up to a high potential. The tubes will not break down, however, as the grids 7 are held at a negative value with respect to the anodes 6 on account of resistor 26 and resistors 64, 55 and 58. By varying the adjustment of the variable resistor 58, the potential of the grids 7 may be adjusted to a value necessary for stable operation. If the potential of the grid is raised, the tube will break down, causing the condenser 25 to discharge very rapidly, and cause the tubes to emit a bright flash of light of very short duration. The discharging of condenser 25 lowers the potential across the tubes to cause the breakdown to discontinue.

The periodic operation of the light unit 1 may be obtained by connecting conductors 103 and 106 of the multivibrator unit 67 to the female contact members 104 and 107, respectively, of the light unit 1.

The trapezoidal wave form of the output of the multivibrator unit 67 impressed upon the condensers 102 and 105 gives a very peaked current through the resistors 55 and 56. The drop across the resistors 55 and 56 raises the potential of the grids 7, and the tubes 2, 3 and 4 will break down. Before the condenser 25 has again charged to a high value, the current from the multivibrator has dropped to zero. This cycle is continued in accordance with the frequency of the multivibrator.

Since the frequency of the multivibrator may be varied by adjusting the variable resistor 95, it is apparent that the frequency of the light flashes of tubes 2, 3 and 4 may be varied at the will of the operator.

When a vibrating or rotating object is to be examined, the operator places the tubes 2, 3 and 4 so that their light is concentrated upon the object. The resistor 95 is then so adjusted that the frequency of the light flashes synchronizes with the frequency of the object. The object will then appear to stand still. If it is desired to study the progress of the object during a complete cycle, the frequency of the multivibrator may be slightly decreased, and the object being studied will appear to move slowly in a forward direction. In the same manner, if the frequency of the multivibrator is increased, the object will appear to move in a reverse direction.

The operation of the device, when using the modification in Figs. 3 and 4, is as follows:

The switch 35 is actuated, as explained above, to first heat the tube filaments and then to establish a circuit through the power pack 50.

The male contact members 133 and 132 are connected to the female contact members 107 and 104, respectively. The operator then grasps the handle 109 of the mechanical contactor 108 and places the tip 117 in operative contact with the lathe center of a rotating object. The metal spider 118 will then revolve at exactly the same speed as the rotating object, and the tips 120 and 123 of the contact members 119 and 122, respectively, will engage once for every revolution of the object. During the period of contact, the grid 7 will be momentarily connected, through resistor 64 to the anode 6, and a relatively high potential will be impressed upon the grids 7 of the tubes 2, 3 and 4. As explained above, the tubes will then break down, condensers 25 will discharge, and the tubes will emit a brilliant flash of light. Before the next contact, the condensers will recharge, and the same operation will thus take place for every revolution of the mechanical contactor.

The conical tips of the contact members 119 and 122 are made of polished steel and are so constructed that a minimum of arcing takes place when contact is broken.

I do not wish to be restricted to the specific arrangement of parts and circuit connections shown and described as it is evident that various modifications thereof will fall within the spirit and scope of my invention. I desire, therefore, that only such limitations be imposed as are indicated in the appended claims.

I claim as my invention:

1. A contactor device for flashing a stroboscope in synchronism with a rotating member comprising a casing, a ring rotatably mounted within said casing, a contact member secured to said ring, a shaft eccentrically mounted with respect to said ring within said casing, a spider secured to said shaft, a second contact member secured to said spider, means associated with said ring for adjusting the position of said first mentioned contact member with respect to said second contact member, and friction driving means on said shaft for engaging the rotating member.

2. Electrical apparatus comprising a grid-glow tube having a cathode, an anode, and a control electrode, means for applying a voltage across said cathode and said anode, and means for periodically applying a voltage to said control electrode of sufficient value to cause a discharge in said tube, said last means comprising a multivibrator with an output voltage of a tapezoidal wave form.

3. Electrical apparatus comprising a grid-glow tube having a cathode, an anode, and a control electrode, means for applying a voltage across said cathode and said anode, a condenser connected across said cathode and said anode, and means for periodically applying a voltage to said control electrode of sufficient value to cause a discharge in said tube, said last means comprising a multivibrator with an output voltage of a trapezoidal wave form.

4. A stroboscope for viewing an object in motion comprising a light source in the light from which said object may be viewed, means including a source of direct current and a voltage operated device for causing said light source to emit a flash of light in response to a voltage above a predetermined value applied to said device, and means for periodically applying a voltage having a substantially vertical wave front to said voltage operated device, the maximum value of the voltage at the wave front being greater than said predetermined value.

5. Electrical apparatus comprising a grid-glow tube having a cathode, an anode, and a control electrode, a condenser connected across said cathode and said anode, means for applying a periodic voltage of trapezoidal wave form to said control electrode, and means for charging said condenser, the charging rate being such that said periodic voltage has dropped to zero before said condenser becomes fully charged.

6. Electrical apparatus comprising an electrical tube of the gas filled type having a cathode, an anode, and a control electrode, a condenser connected across said cathode and said anode, said tube having the characteristic that with a predetermined charge on said condenser and a predetermined voltage on said control electrode a discharge will take place between said cathode and said anode, means for applying to said control electrode a periodic voltage having a steep wave front and having a maximum voltage at least equal to said predetermined voltage, and means for charging said condenser, the charging rate being such that said condenser does not reach said predetermined charge until said periodic voltage has decreased to a value below said predetermined voltage.

DEWEY D. KNOWLES.